(12) United States Patent
Nakazawa et al.

(10) Patent No.: US 6,828,069 B1
(45) Date of Patent: Dec. 7, 2004

(54) METHOD FOR CORRECTING DEFECTS ON COLOR FILTER

(75) Inventors: Shigeyasu Nakazawa, Tokyo (JP); Takuji Watanabe, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 09/602,477

(22) Filed: Jun. 23, 2000

(30) Foreign Application Priority Data

Jun. 25, 1999 (JP) .......................................... 11-179232
May 30, 2000 (JP) ....................................... 2000-159793

(51) Int. Cl.[7] .......................... G02B 5/20; G02F 1/1335
(52) U.S. Cl. .......................................... 430/7; 430/945
(58) Field of Search ...................... 430/7, 945; 349/192

(56) References Cited

U.S. PATENT DOCUMENTS 5,714,195 A * 2/1998 Shiba et al. ................. 427/140
6,035,526 A * 3/2000 Saruta et al. ................... 29/846
6,239,856 B1 * 5/2001 Imura et al. ................. 349/192

FOREIGN PATENT DOCUMENTS

JP    3-274504    12/1991
JP    9-184910    7/1997

* cited by examiner

*Primary Examiner*—John A. McPherson
(74) *Attorney, Agent, or Firm*—Dellett & Walters

(57) ABSTRACT

The present invention provides a method for correcting defects on a color filter with the purpose of correcting defects caused in a process to manufacture the color filter and of extensively improving the percentage of high quality products, and the method comprises the steps of setting a diameter of a laser beam on a circular correcting region M when the defects on the color filter are removed by irradiation of the laser beam, dropping a corrective ink G' to upper surface of the circular correcting region by an ink jet unit after the circular correcting region has been removed, and hardening and shrinking the corrective ink by as ink hardener thereafter.

4 Claims, 4 Drawing Sheets

FIG. 2
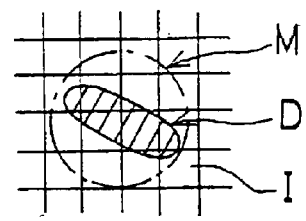
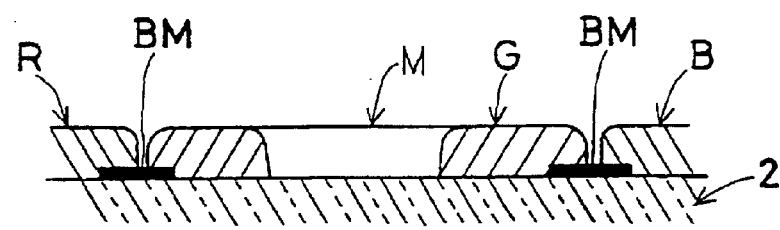
FIG. 3(A)
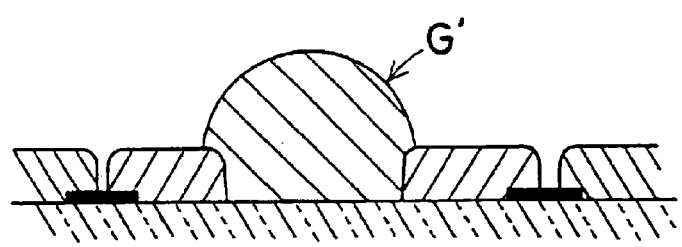
FIG. 3(B)
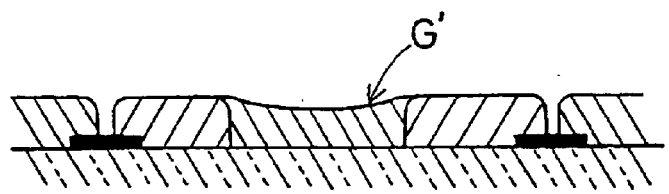
FIG. 3(C)

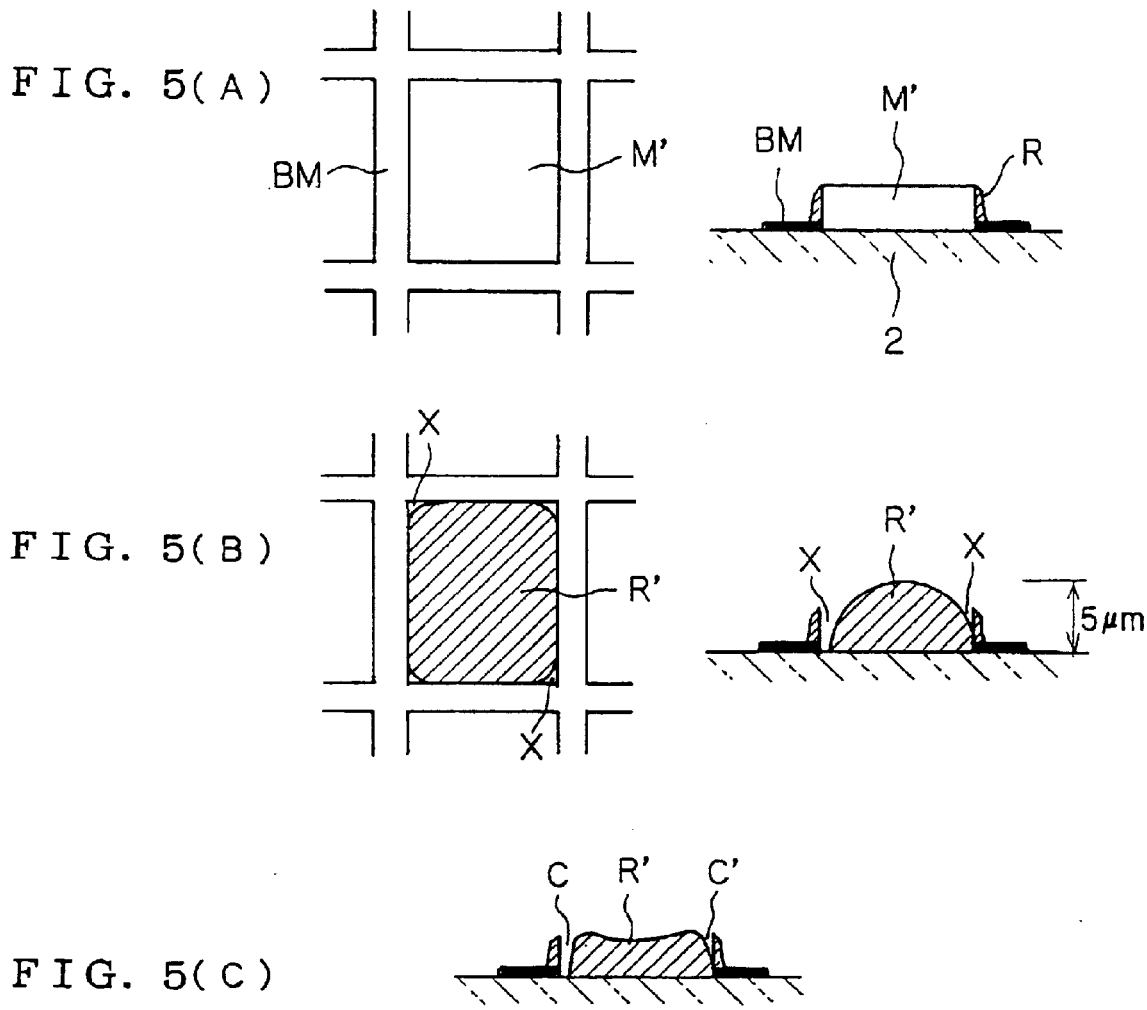
FIG. 5(A)
FIG. 5(B)
FIG. 5(C)
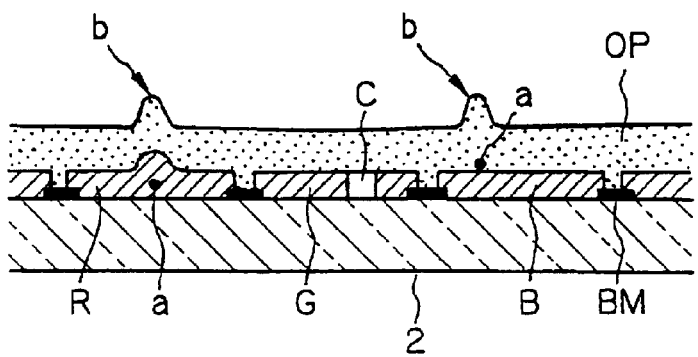
FIG. 6

METHOD FOR CORRECTING DEFECTS ON COLOR FILTER

BACKGROUND OF THE INVENTION

The present invention relates to a method for correcting protruding defects or white or black defects on a color filter, which occur during a process to manufacture a color filter for liquid crystal display apparatus.

Referring to FIG. 6, description will be given below on an example of a method for manufacturing a color filter. On a transparent substrate 2 such as a glass plate, a light-shielding layer BM comprising striped pattern with line width of 20 µm, pitch of 80 µm, and film thickness of about 0.5 µm is formed by screen printing. Next, on the light-shielding layer, a red colorant sensitive material R is coated. Then, a photo mask is placed and light exposure is performed. Next, a green pattern layer and a blue pattern layer are formed by the same procedure. Both longitudinal sides of each color pattern layer are overlapped on the light-shielding layer BM for a length of about 10 µm, and the film thickness is about 2 µm. Next, with the purpose of achieving physico-chemical protection, and of evenly adjusting and flattening the surface, a photo-curing resin is coated on the color pattern layer, and a protective film layer OP is formed in film thickness of about 2–3 µm. Further, a film of indium tin oxide (ITO) is formed on the protective layer by vacuum film forming method, and electrode pattern is fabricated by mask deposition method, etching method, etc., and a transparent electrode layer is formed to prepare a color filter.

In the process to manufacture the color filter as described above, foreign objects "a" such as dust are intermingled in the coating process to cost color sensitive material as shown in FIG. 6. If these objects remain on the color pattern layers R, G or B or foreign objects such as dust are attached on the surface of the color pattern layer, protruding defects "b" may be formed on the portions corresponding to the foreign objects such as dust when the protective layer OF is formed on the color pattern layer. Also, when dust is attached on the photomask, white defects "c" may occur on the color pattern layer or black defects may be generated on the light-shielding layer EM. Such defects may impair orientation of liquid crystals in liquid crystal cells, which are provided on the surface of the color filter, or may lead to defects in the images taken or displayed, and the products produced using the color filter may become defective. In the past, as described in JP-A-3-274504 or JP-A-9-184910, methods have been proposed to coat a colorant sensitive material after cutting the defective portion off and to remove it using the laser beam in order to correct the above defects.

SUMMARY OF THE INVENTION

However, according to the conventional method for correcting defects as described above, it is difficult to fill ink to corners when the corrective ink is dropped to the upper surface because about the entire region of picture element is cut in rectangular shape, and void patches or unevenly colored portions are likely to occur. Also, the quantity of the colorant to be removed is higher than the case when only the portion near the defects are cut off. As a result, colorant materials are splashed to the surrounding regions, and these may cause new defects. Further, in case the hue of the corrective ink is different by approximately one picture element from the hue of colorant picture element, defects are very likely to occur due to color difference. As a result, the percentage of acceptable products after correction may be low.

To solve the above problems, it is an object of the present invention to provide a method for correcting defects on a color filter, by which it is possible to correct all of protruding defects, white defects and black defects, which are generated in the process to manufacture color filter and to extensively improve the percentage of high quality products.

To attain the above object, an aspect of the invention provides a method for correcting defects on a color filter, which comprises the steps of setting a diameter of a laser beam in a circular correcting region including defective portion, or more preferably, in a circular correcting region comprising a circle which circumscribes the defective portion in order to ensure better permeation of liquid and better diffusion, and to prevent uneven coloring due to insufficient flow of the liquid when the defective portion on then color filter is removed by irradiation of the laser beam, dropping a corrective ink to upper surface of the circular correcting region by an ink jet unit so that the ink is formed in spherical shape after the circular correcting region has been removed, and hardening and shrinking the corrective ink by an ink hardener thereafter so that variation of film thickness in the circular correcting region can be controlled within 0.1 µm.

The invention according to another aspect provides a method for correcting defects on a color filter, said method comprising the step of setting a diameter of a laser beam on a circular correcting region including defective portion when the defective portion on the color filter is removed by irradiation of the laser beam, and depositing a metal film of more than 1000 angstrom in thickness by laser CVD method on the circular correcting region after the circular correcting region has been removed so that back light can be completely shielded.

According to the present invention, it is possible to easily correct all of protruding defects, white defects and black defects caused in the process for manufacturing the color filter, and also to extensively improve the percentage of high quality products. Further, according to an aspect of the invention, ink can be dropped by selecting ink color depending on the defective region by the ink jet unit. For example, in case the correcting region is a green pattern layer, a green corrective ink can be dropped. As a result, defects on the green pattern portion can be easily corrected without resulting in uneven coloring.

BRIEF DESCRIPTION OF THE DRAWINGS

FIG. 2 is a drawing to explain setting of a diameter of laser beam in the arrangement shown in FIG. 1;

FIGS. 3A–3(C) represent drawings to explain Example 1 shown in FIG. 1;

FIGS. 5(A)–5(C) represent drawings to explain a comparative example shown in FIG. 1; and FIG. 6 is an enlarged sectional view to explain a defect on a color filter.

DETAILED DESCRIPTION OF THE PREFERRED EMBODIMENTS

Figure 1:
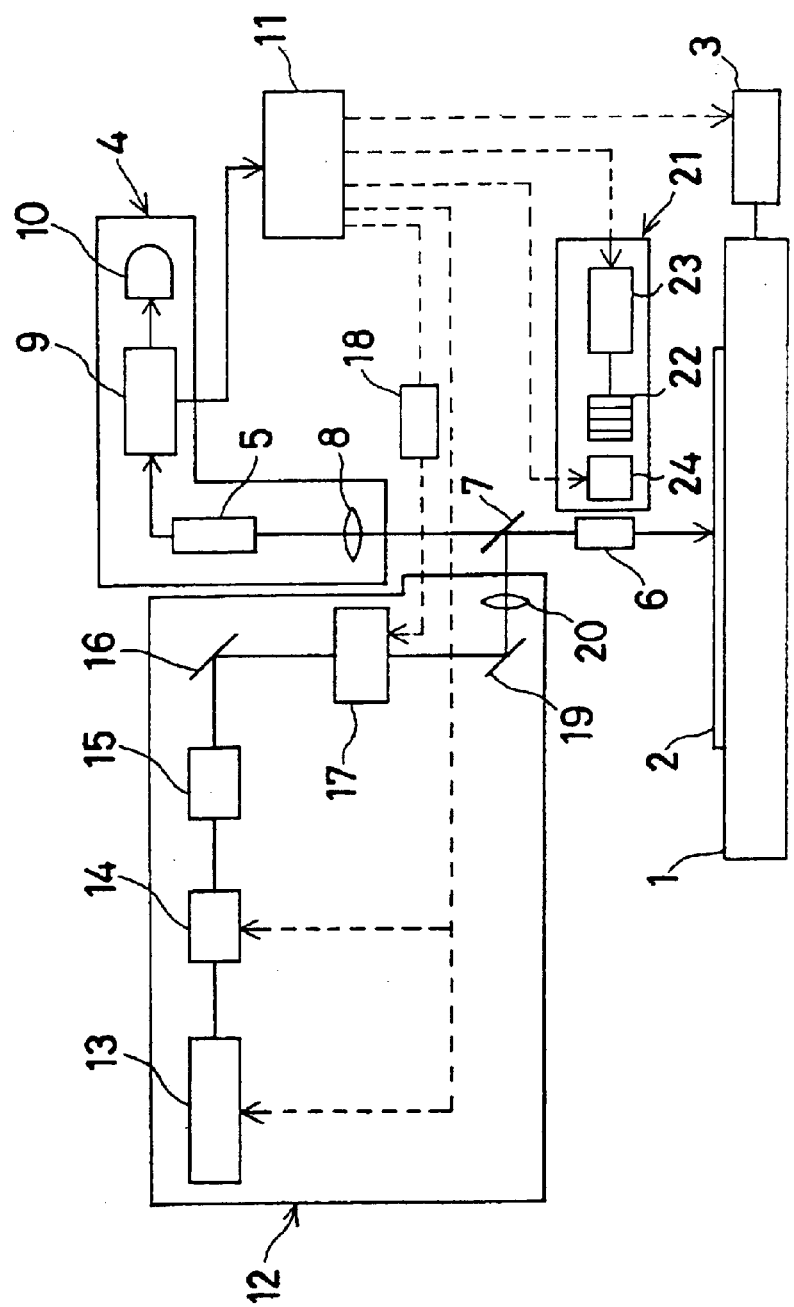
FIG. 1 is a block diagram to explain an example of a method for correcting defects on a color filter according to the present invention.
Figure 4A:
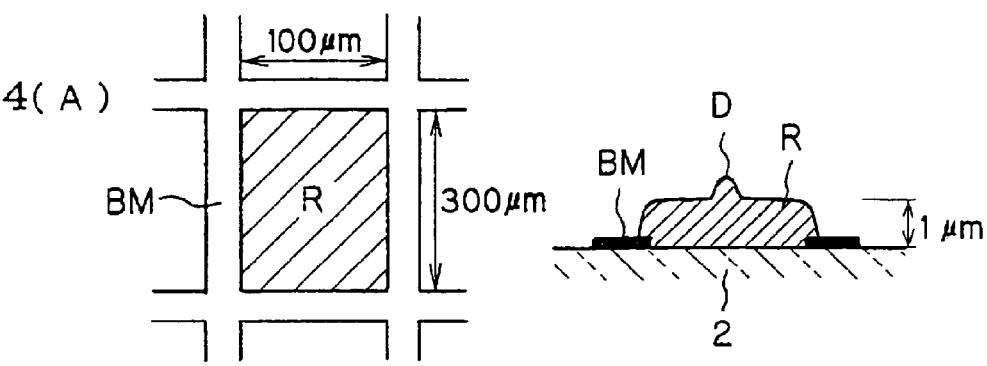
FIGS. 4(A)–4(D) represent drawings to explain Example 2 shown in FIG. 1.
Figure 4B:
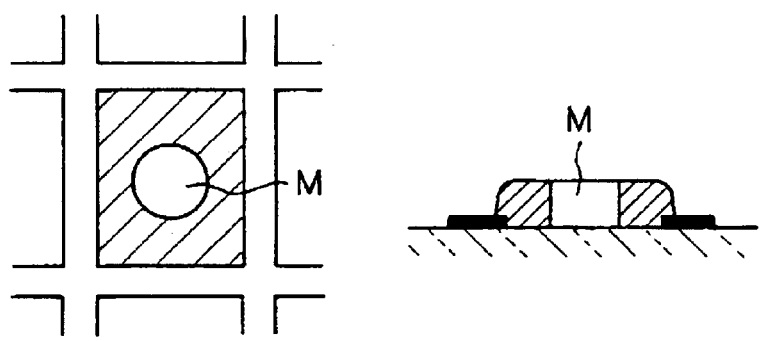
Figure 4C:
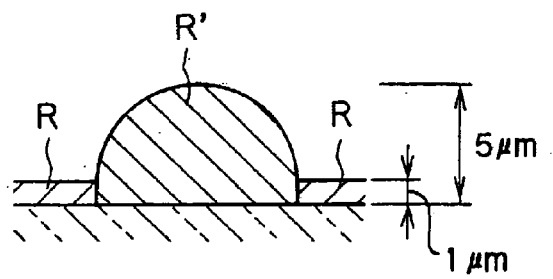
Figure 4D:
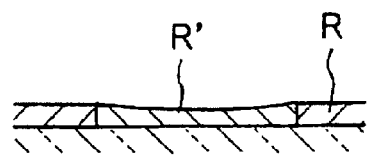

Description will be given below on embodiments of the present invention referring to the drawings. FIG. 1 is a block diagram to explain an example of a method for correcting defects on a color filter according to the present invention.

In FIG. 1, a substrate 2, which has a color pattern layer as described above formed on it, is placed on an XYθ stage (substrate moving stage) 1. This XYθ stage can be moved along XY plane and at a tilt angle θ by a driving mechanism 3. A defect detecting unit 4 is a device for checking defects on a color filter as described above. A CCD camera 5 takes an image of the substrate 2 via an objective lens 6, a semitransparent mirror 7 and an image forming lens 8. The data of the image thus taken is sent to an image processing unit 9, where the data is binarized with a preset threshold, and a defective portion on the substrate 2 is extracted. The extracted defect information is displayed on a display 10 for confirmation, and it is sent to an arithmetic unit 11.

A laser irradiation unit 12 irradiates a laser beam to the defective portion detected by the defect detecting unit and it is used to remove substances which are present within that region. The laser beam is emitted from a UV laser oscillator 13 (YAG laser) with output of 15 mj or more (wavelength: 1067 nm) or with output of 2 mj or more (wavelength: 533.5 nm), and irradiation energy density of the laser beam is increased or decreased by a density adjuster 14. The diameter of the laser beam is enlarged by a diameter enlarger 15, and intensity of the laser beam is equalized, and it enters an opening adjuster 17 via a mirror 16. The opening adjuster 17 is provided with a plurality of moving plates around the opening. By moving the moving plates using a driving mechanism 18, the diameter of the opening is adjusted, and the diameter of the laser beam can be adjusted to the value as desired. That is, as shown in FIG. 2, when a defective portion D is picked up on a picture element I of a CCD camera, a diameter "r" of the laser beam is set within a circular correcting region M, which comprises a circle circumscribing the defective portion D, and its center is used as a position information of the defective portion D. The circular correcting region M may be a circle, which includes the defective portion D. The diameter "r" can be changed within the range of 50 to 150 μm. After the diameter of the laser beam has been adjusted to a desired value by the opening adjuster 17, the laser beam is protruding to the substrate 2 positioned on the XYθ stage 1 via a mirror 19, an image forming lens 20, the semitransparent mirror 7 and the objective lens 6.

A defect correcting unit 21 is a device to place and fill a pattern layer into a portion, from where the substances have been removed by the laser irradiating unit 12, and it is provided with an ink discharge unit 22, a driving circuit 23 for driving the ink discharge unit and an ink hardener 24. As the ink discharge unit 22, a dispenser or an ink jet device may be used. As the method for discharging from the dispenser, a continuous discharge method for continuously discharging the ink or an intermittent discharge method for intermittently discharging the ink after ink drops are prepared may be used. As the ink jet unit, there are two types: continuous type and on-demand type. The former is to apply an electric field while ink is continuously injected, and ink is collected on a capture dish so that ink is not coated on the substrate of the color filter. According to the latter, the color filter substrate is moved, and ink discharge is turned on or off, depending on the position of the substrate. As the ink discharge unit 22 as described above, it is preferable to use an ink jet unit. Other methods are that corrective inks can also be dropped by laser thermo-fusible transfer method, needle painting method, and so on. In the following, description will be given by taking an example on the ink jet unit.

The ink jet unit 22 is a device to drop corrective ink in four colors of red, green, blue and black. The corrective ink is preferably an ink made of thermo-curing resin or UV-curing resin with higher surface tension. The ink hardener 24 comprises a heating block or a UV-irradiation spot light source. It is designed in such manner that the ink jet unit 22 and the ink hardener 24 can be moved toward the substrate 2 by a lift mechanism (not shown).

The arithmetic unit 11 transmits an information, which indicates shape of the defective portion and its position to the driving mechanism 18, and drives the opening adjuster 17 to change the diameter of the laser beam. At the same time, it drives the XYθ stage 1 and determines irradiating position of the laser beam. Also, it transmits signals to the UV laser oscillator 13 and the density adjuster 14 and controls irradiation time, number or times of irradiation, and irradiation energy density. Signals of ink color and ink drop quantity are sent to the driving circuit 23, and the ink jet unit 22 is controlled.

Next, description will be given on Examples 1 and 2 and comparative example of this embodiment. First, Example 1 will be described referring to FIG. 3.

FIG. 3 (A) shows a condition where the circular correcting region M including the defective portion of a green pattern layer G is removed by the laser beam. In this example, line width of a light-shielding layer BM is 20 μm, EM spacing is 80 μm, film thickness of a colored layer RGB is 1.4 μm, and diameter of the circular correcting region M is 55 μm. Next, green corrective ink G' is dropped to the circular correcting region M by the ink jet unit 22 as shown in FIG. 3 (B). As the green corrective ink G', thermo-curing resin or UV-curing resin is used.

The following materials were used as the thermo-curing resin:

| | |
|---|---|
| Binder resin: | Copolymer of benzyl methacrylate and glycidyl methacrylate |
| Multifunctional epoxy resin: | Cresol novolak type epoxy resin |
| Polyvalent carboxylic acid: | Trimellitic acid |
| Solvent: | Propylene glycol monomethylether acetate |
| G pigment: | C.I. No. Pigment Green 36 |
| Y pigment: | C.I. No. Pigment Yellow 150 |
| Dispersant: | Solsperse 24000 (manufactured by Avicia) |

A pigment dispersion composition having the following components was used as UV-curing resin:

| | |
|---|---|
| Binder resin: | Copolymer of methacrylic acid and benzyl methacrylate |
| Multifunctional monomer: | Trimethylolpropane triacrylate |
| Photopolymerisation initiator: | Irgacure 907 (manufactured by Ciba Specialty Chemicals) |
| Solvent: | Ethoxyethyl propionate |
| G Pigment: | C.I. No. Pigment Green 36 |
| Y Pigment: | C.I. No. Pigment Yellow 150 |
| Dispersant: | Solsperse 24000 (manufactured by Avicia) |

Discharge quantity (volume) of this ink was 4 drops at the rate of 20 PI/drop. That is, ink drops of 80 PI were dropped so that the ink is formed in spherical shape on upper surface of the circular correcting region (FIG. 3 (B)). Finally, when the corrective ink G' was hardened using the ink hardener 24, the corrective ink G' was shrunk as shown in FIG. 3 (C), and the circular correcting region M was filled and corrected to be flush. Thus, it is possible to equalize variation in film thickness to 0.1 μm, and unevenness of color can also be corrected almost to the level suitable for practical use.

In case of thermo-curing resin, when the corrective ink G' is hardened, baking was performed at 220° C. for 10 minutes on the heating block. By this heating, the spherically swollen form of ink by 5 μm higher than the upper surface of the surrounding portion after ink dropping was reduced to a form of a concave lens by 0.05 μm lower than the upper surface of the surrounding portion. In case of UV-curing resin, ultraviolet may was irradiated by spot irradiation of 1000 mj/cm$^2$, and baking was performed at 200° C. for 30 minutes on the heating block. By this heating, the spherically swollen form of ink by 5 μm higher than the upper surface of the surrounding portion was turned to a form of a convex lens which was by 0.09 μm higher than the upper surface of the surrounding portion.

Next, Example 2 will be described referring to FIG. 4. FIG. 4 (A) shows a red pattern layer R. A protruding defective portion D is present where the size of picture element is 100×300 μm, and film thickness is 1 μm. FIG. 4 (B) shows a condition where the circular correcting region M including the defective portion D is removed by the laser beam. Diameter of the circular correcting region M is 60 μm. Next, red corrective ink R' is dropped to the circular correcting region M by the ink jet unit 22 as shown in FIG. 4 (C). As the red corrective ink R', thermo-curing resin is used.

The following substances were used as the thermo-curing resin:

| | |
|---|---|
| Binder resin: | Copolymer of benzyl methacrylate and glycidyl methacrylate |
| Multifunctional epoxy resin: | Cresol novolak type epoxy resin |
| Polyvalent carboxylic acid: | Trimellitic acid |
| S lvent: | Propylene glyc l monomethylether acetate |
| R Pigment: | C.I. No. Pigment Red 254 |
| Y Pigment: | C.I. No. Pigment Yellow 139 |
| Dispersant: | Solsperse 24000 (manufactured by Avicia) |

Discharge quantity (volume) of this ink was 4 drops at the rate of 20 PI/drop. That is, ink drops of 80 PI were dropped, and the ink was turned to a spherically swollen form by 5 μm higher than the upper surface of the circular correcting region M (FIG. 4 (C)). Finally, baking was performed at 220° C. for 10 minutes on the heating block. By this heating, a spherically swollen portion by 5 μm higher than the upper surface of the surrounding portion formed after dropping of the ink was turned to a form of a concave lens by 0.9 μm lower than the upper surface of the surrounding portion (FIG. 4 (D)). Because the corrective ink having the same hue as the red pattern layer R was filled, there was almost no difference of color on the corrected portion.

Next, the comparative example will be described referring to FIG. 5. In the same manner as in Example 2 shown in FIG. 4 (A), correction was carried out on the red pattern layer R where a protruding defective portion D was present with size of the picture element 100×300 μm and film thickness of 1 μm. As shown in FIG. 5 (A), a mask with rectangular opening was placed, and a correcting region M' including the defective portion D was removed by the laser beam. The size of the portion to be removed was 100×300 μm, and this approximately corresponded to one picture element. Next, to the correcting region M' of the portion to be removed, a red corrective ink R' which was the same corrective ink as in Example 2 was dropped by the same procedure as in Example 2. As shown in FIG. 5 (B), a portion not filled with ink (ink-lacking portion) X was generated at each of four corners of the rectangular correcting region M'. Next, when baking was carried out by the same procedure as in Example 2, a void portion C or unevenly colored portion C' due to insufficient film thickness was found as shown in FIG. 5 (C).

Next, description will be given on another embodiment of the present invention. In the above embodiment, the defect correcting unit 21 comprises an ink jet unit 22, a driving circuit 23, and an ink hardener 24. In the present embodiment, however, instead of the defect correcting unit, a device based on the laser CVD method is used, and a metal film of light-shielding film BM, which has chromium or tungsten as the main components such as $Cr(CO)_6$, $W(CO)_6$, is deposited by vacuum evaporation in thickness of 1000 angstrom or more. According to this method, similarly to the case of the defect correcting unit 21, the substance in the circular correcting region M detected by the information transmitted from the arithmetic unit 11 are removed, and the metal film of the light-shielding film EM is deposited on the circular correcting region M. As a result, back light can be completely shielded. Even when the circular correcting region is a color pattern layer, the metal film of the light-shielding film EM is deposited. No problem occurs in the produced color filter, and not only black defects but also protruding defects or white defects on the color pattern layer can be corrected. When the device based on the laser CVD method is used, the thickness of the metal film to be deposited can be adjusted, and it is possible to form a color pattern layer with no variation in film thickness.

What is claimed is:

1. A method for correcting a defect, which is not substantially constituted by the presence of a foreign body, on a color filter, comprising the steps of providing a laser irradiation unit and an ink jet unit, each in movable relation to a color filter, setting a diameter of a laser beam of the laser irradiation unit on a circular correcting region including a defective portion and irradiating the circular correcting region to remove the defective portion of the color filter and to create a circular depression adapted to receive and retain ink, and using the ink jet unit to drop a corrective ink into the circular depression, and hardening and shrinking the corrective ink by an ink hardener thereafter.

2. A method for correcting defects on a color filter, comprising the steps of setting a diameter of a laser beam on a circular correcting region including a defective portion when the defective portion of a color filter is removed by irradiation of the laser beam, and depositing a metal film by laser CVD method to the circular correcting region after the circular correcting region has been removed.

3. A method for correcting defects on a color filter according to claim 2, wherein the metal film to be deposited by the laser CVD method contains chromium or tungsten as main components.

4. A method for correcting defects on a color filter according to claim 2 or 3, wherein the defective portion to be removed by irradiation of the laser beam is a black defect.

* * * * *